(12) United States Patent
Seiler

(10) Patent No.: US 7,170,009 B2
(45) Date of Patent: Jan. 30, 2007

(54) METHOD OF INTERFACING A REMOTE WAND TO ELECTRONICS CONTROL CHASSIS

(75) Inventor: Dieter Seiler, Carleton Place (CA)

(73) Assignee: Red Current Technologies Inc., Carleton Place (CA)

( * ) Notice: Subject to any disclaimer, the term of this patent is extended or adjusted under 35 U.S.C. 154(b) by 0 days.

(21) Appl. No.: 11/176,334

(22) Filed: Jul. 8, 2005

(65) Prior Publication Data

US 2006/0007187 A1      Jan. 12, 2006

Related U.S. Application Data

(60) Provisional application No. 60/586,224, filed on Jul. 9, 2004.

(51) Int. Cl.
*H01B 7/17*     (2006.01)

(52) U.S. Cl. ............. 174/135; 174/69; 174/72 A; 174/136; 235/375; 235/462.49; 345/180; 353/42

(58) Field of Classification Search ........... 174/46, 174/47, 60, 65 SS, 68.1, 68.3, 69, 70 S, 72 A, 174/72 C, 73.1, 96, 135, 136, 650, 651; 345/180, 345/182, 183; 353/42, 43; 235/375, 462.49
See application file for complete search history.

(56) References Cited

U.S. PATENT DOCUMENTS

| | | | | |
|---|---|---|---|---|
| 3,393,299 A * | 7/1968 | Baker | ............... | 377/24 |
| 3,498,692 A * | 3/1970 | Jewitt et al. | ............... | 345/180 |
| 4,321,933 A * | 3/1982 | Baessler | ............... | 600/549 |
| 4,642,459 A * | 2/1987 | Caswell et al. | ............... | 235/462.49 |
| 4,649,027 A * | 3/1987 | Talbot | ............... | 422/84 |
| 4,922,236 A * | 5/1990 | Heady | ............... | 345/166 |
| 5,006,699 A * | 4/1991 | Felkner et al. | ............... | 235/462.49 |
| 5,892,824 A * | 4/1999 | Beatson et al. | ............... | 713/186 |
| 5,938,308 A * | 8/1999 | Feldman et al. | ............... | 353/42 |
| 5,953,001 A * | 9/1999 | Challener et al. | ............... | 345/179 |
| 6,945,725 B2 * | 9/2005 | Cui | ............... | 345/183 |
| 6,971,984 B2 * | 12/2005 | Ardizzone | ............... | 600/9 |

* cited by examiner

*Primary Examiner*—Dean A. Reichard
*Assistant Examiner*—Adolfo Nino

(57) ABSTRACT

A method is provided for interfacing a remote wand to its electronics control chassis by means of a coiled cable. The wand may consist of a sensor such as a light-sensitive detector, and the control electronics provide amplification and processing of the received light signal. The interface cable connecting the wand to the receiver chassis consists of a coiled cable which is stored inside the wand itself. This method provides maximum protection, efficient utilization of space, and avoids the problems associated with exposed interface cables and moving parts.

18 Claims, 1 Drawing Sheet

METHOD OF INTERFACING A REMOTE WAND TO ELECTRONICS CONTROL CHASSIS

RELATED APPLICATION

The present application is based on and claims priority to the Applicant's U.S. Provisional Patent Application 60/586,224, entitled "METHOD OF INTERFACING A REMOTE WAND TO ELECTRONICS CONTROL CHASSIS," filed on Jul. 9,2004.

FIELD OF THE INVENTION

The present invention relates to the physically interfacing of a remote wand device to the chassis housing the wand's control electronics.

BACKGROUND OF THE INVENTION

Light pens and other wand-type sensors that are hand-held must typically be interfaced to their receiving electronics via a cable. On small portable instrumentation, where space is at a premium, there is a problem of where to place the cable so that it is stored both safely and easily. The cable must be able to spool out freely when the wand is in use. Typically, wand cables may be straight or coiled, however, in common practice they are usually left exposed, outside of both the wand and the control electronics chassis. This presents a problem of how to store the exposed cable when the wand is not in use. Typically, the cable is simply left dangling and exposed when the wand is stored. Storage of the cable in this manner has several problems associated with it. First, the exposed cable may be damaged or simply "get in the way". Second, the overall appearance of the assembly is not as pleasing, compact, or efficient as it could be if the exposed cable were not present. Ideally, no part of the cable should be left exposed when the wand is stored, especially for hand-held portable devices.

It is the object of this invention to overcome the disadvantages of an exposed interface cable when a wand is stored. This is achieved by incorporating a coiled cable and storing the interface cable inside the wand itself. This avoids the use of extra compartments on the electronics control chassis, and provides total protection for the stored cable, allowing for an extremely compact and efficient system design.

SUMMARY OF THE INVENTION

Embodiments of the present invention include:

A wand for operation remote from an apparatus including an elongate body having a first end for receiving a device to be coupled to the apparatus, a second end remote from the first and an elongate cavity open at the second end, and a coiled conduit coupled to the first end and received by the elongate cavity, whereby the coiled conduit is stored substantially within the elongate body when not in use.

Apparatus including a housing and a wand remote from the housing having an elongate body having a first end for receiving a device to be coupled to the apparatus, a second end remote from the first and an elongate cavity open at the second end, and a coiled conduit coupled to the first end and received by the elongate cavity, whereby the coiled conduit is stored substantially within the elongate body when not in use.

Apparatus including a housing and a wand remote from the housing having an elongate body having a first end for receiving a device to be coupled to the apparatus, a second end remote from the first and an elongate cavity open at the second end, and a coiled conduit coupled to the first end and received by the elongate cavity, the housing including a docking site for receiving the wand whereby the coiled conduit is stored substantially within the elongate body and the wand is docked on the housing when not in use.

A wand for operation remote from an apparatus for inputting including an elongate body having a first end for receiving a sensor to be coupled to the apparatus, a second end remote from the first and an elongate cavity open at the second end, and a coiled conduit coupled to the sensor and received by the elongate cavity, whereby the coiled conduit is stored substantially within the elongate body when not in use.

Apparatus for inputting including a housing and a wand remote from the housing having an elongate body having a first end for receiving a sensor to be coupled to the apparatus, a second end remote from the first and an elongate cavity open at the second end, and a coiled conduit coupled to the sensor and received by the elongate cavity, whereby the coiled conduit is stored substantially within the elongate body when not in use.

Apparatus for inputting including a housing and a wand remote from the housing having an elongate body having a first end for receiving a sensor to be coupled to the apparatus, a second end remote from the first and an elongate cavity open at the second end, and a coiled conduit coupled to the sensor and received by the elongate cavity, the housing including a docking site for receiving the wand whereby the coiled conduit is stored substantially within the elongate body and the wand is docked on the housing when not in use.

A wand for operation remote from an apparatus for outputting including an elongate body having a first end for receiving a transducer to be coupled to the apparatus, a second end remote from the first and an elongate cavity open at the second end, and a coiled conduit coupled to the transducer and received by the elongate cavity, whereby the coiled conduit is stored substantially within the elongate body when not in use.

Apparatus for outputting including a housing and a wand remote from the housing having an elongate body having a first end for receiving a transducer to be coupled to the apparatus, a second end remote from the first and an elongate cavity open at the second end, and a coiled conduit coupled to the transducer and received by the elongate cavity, whereby the coiled conduit is stored substantially within the elongate body when not in use.

Apparatus for outputting including a housing and a wand remote from the housing having an elongate body having a first end for receiving a transducer to be coupled to the apparatus, a second end remote from the first and an elongate cavity open at the second end, and a coiled conduit coupled to the transducer and received by the elongate cavity, the housing including a docking site for receiving the wand whereby the coiled conduit is stored substantially within the elongate body and the wand is docked on the housing when not in use.

In the embodiments above, an elongate cavity is provided for storing the coiled conduit, however numerous alternative embodiments are possible. For example, the housing could include an elongate cavity for storing a portion or all of the coiled conduit.

A further embodiment includes apparatus comprising a housing including an elongate cavity and a wand remote from the housing and including a first end for receiving a device to be coupled to the apparatus and a coiled conduit coupled to the first end and received by the elongate cavity, whereby the coiled conduit is stored substantially within the elongate cavity when not in use.

BRIEF DESCRIPTION OF THE DRAWINGS

The present invention will be further understood from the following detailed description with reference to the drawings in which.

DETAILED DESCRIPTION OF THE PREFERRED EMBODIMENT

The wand type that may benefit from this invention may be either input or output. Input wand types usually consist of sensors that detect levels of light, magnetism, moisture, or other properties. Output wand types usually contain a transducer or source of energy, such as a laser beam, light, ultrasonic sound, or other similar output device.

Figure 1:
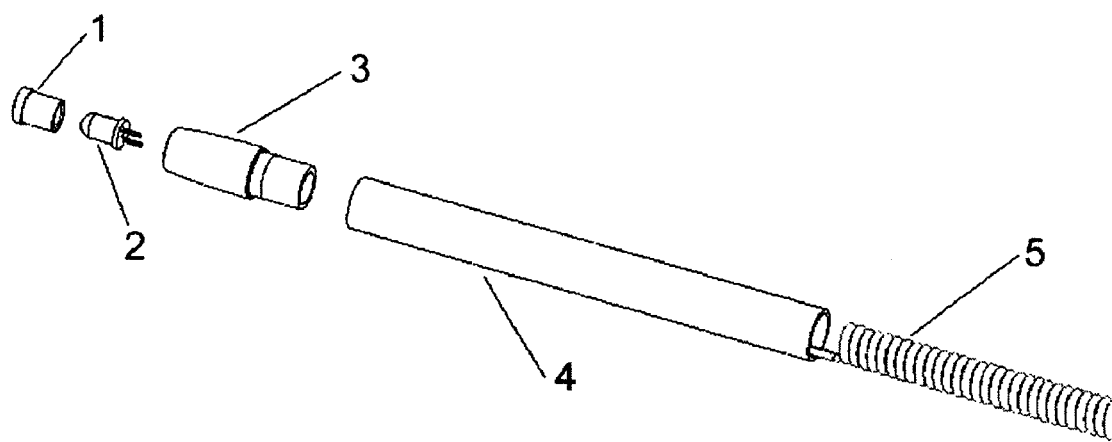
FIG. 1 shows an exploded view of a light sensor wand.

Referring to FIG. 1, there is illustrated in an embodiment of the present invention a light pen, which includes a plastic lens 1, a light sensor 2, a pen tip housing 3, a hollow pen shaft 4, and a coiled cable 5. The coiled cable 5 is designed such that it easily slides through the hollow pen shaft 4. The conductors of the coiled cable 5 are fed through the pen tip housing 3, and attached to the light sensor 2 by either solder or crimp methods. The light sensor 2 and its connections to the coiled cable 5 are then placed inside the pen tip housing 3, where a mechanical feature in the design may be used to strain relief the coiled cable 5, or alternatively the cable and sensor assembly may be potted inside the pen tip housing 3. The plastic lens 1 is designed to snap into the pen tip housing 3 and provides for focusing of the incoming light onto the sensor. The hollow pen shaft 4 is glued onto the pen tip housing 3, which completes the assembly of the light pen. The other end of the coiled cable 5 is fed through a hole and strain relief feature inside the electronics control chassis 6, where the cable conductors are attached to the control circuit board using either a connector set or direct solder connections.

Figure 2:
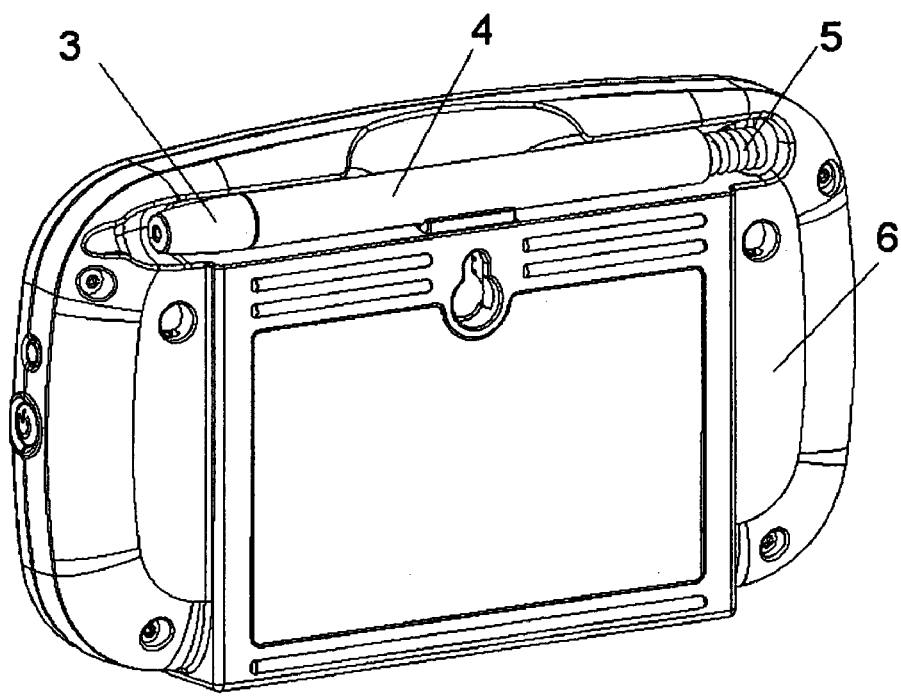
FIG. 2 shows an assembled light sensor wand stored onto its portable electronics control chassis.

As illustrated in FIG. 2, the bulk of the coiled cable 5 is stored inside the light pen's hollow shaft 4 (shown here as translucent) when the light pen is stored and not in use. The coiled cable 5 flows freely out of the hollow pen shaft 4 when the light pen is in use, and similarly retracts easily back into the hollow pen shaft 4 when storing the light pen after use. For the type of portable hand-held instrumentation shown in FIG. 2, this invention significantly reduces the volume required to house an interface cable. Furthermore, if the instrument is used or carried with the wand stored in place, the interface cable is protected from possible snags and abrasion. The hollow pen shaft 4 serves the dual purpose of providing a handle to grip the wand with, and storing the interface cable. The exterior shape of the hollow pen shaft 4 may in practice be contoured to any desired profile to suit the exterior design requirements of the wand.

Although the embodiment outlined in this invention relates to coiled cables that include wire conductors, the invention applies equally to other coiled structures such as optical light pipes or fiber optics.

Numerous modifications, variations and adaptations may be made to the particular embodiments of the present invention described above without departing from the scope of the invention as defined in the claims.

What is claimed is:

1. A wand for operation remote from an apparatus comprising:

an elongate body having a first end for receiving a device to be coupled to the apparatus, a second end remote from the first and an elongate cavity open at the second end; and a coiled conduit coupled to the first end and received by the elongate cavity, whereby the coiled conduit is stored substantially within the elongate body when not in use.

2. A wand as claimed in claim 1 wherein the device is a sensor for inputting to the apparatus.

3. A wand as claimed in claim 1 wherein the device is a transducer for outputting from the apparatus.

4. Apparatus comprising:

a housing; and a wand remote from the housing and including an elongate body having a first end for receiving a device to be coupled to the apparatus, a second end remote from the first and an elongate cavity open at the second end, and a coiled conduit coupled to the first end and received by the elongate cavity, whereby the coiled conduit is stored substantially within the elongate body when not in use.

5. Apparatus as claimed in claim 4 wherein the device is a sensor for inputting to the apparatus.

6. Apparatus as claimed in claim 4 wherein the device is a transducer for outputting from the apparatus.

7. Apparatus as claimed in claim 4 wherein the housing includes a docking site for receiving the wand whereby the coiled conduit is stored substantially within the elongate body and the wand is docked on the housing when not in use.

8. Apparatus as claimed in claim 7 wherein the device is a sensor for inputting to the apparatus.

9. Apparatus as claimed in claim 7 wherein the device is a transducer for outputting from the apparatus.

10. Apparatus as claimed in claim 4 wherein the housing includes an elongate cavity for storing a portion of the coiled conduit.

11. Apparatus as claimed in claim 10 wherein the device is a sensor for inputting to the apparatus.

12. Apparatus as claimed in claim 10 wherein the device is a transducer for outputting from the apparatus.

13. Apparatus comprising:

a housing including an elongate cavity; and a wand remote from the housing and including a first end for receiving a device to be coupled to the apparatus and a coiled conduit coupled to the first end and received by the elongate cavity, whereby the coiled conduit is stored substantially within the elongate cavity when not in use.

14. Apparatus as claimed in claim 13 wherein the device is a sensor for inputting to the apparatus.

15. Apparatus as claimed in claim 13 wherein the device is a transducer for outputting from the apparatus.

16. Apparatus as claimed in claim 13 wherein the housing includes a docking site for receiving the wand whereby the coiled conduit is stored substantially within the elongate cavity and the wand is docked on the housing when not in use.

17. Apparatus as claimed in claim 16 wherein the device is a sensor for inputting to the apparatus.

18. Apparatus as claimed in claim 16 wherein the device is a transducer for outputting from the apparatus.

* * * * *